US012374280B2

(12) United States Patent
Park et al.

(10) Patent No.: US 12,374,280 B2
(45) Date of Patent: Jul. 29, 2025

(54) DISPLAY DEVICE AND METHOD OF DRIVING THE SAME

(71) Applicant: LG Display Co., Ltd., Seoul (KR)

(72) Inventors: Jong Sin Park, Paju-si (KR); Hee Young Chae, Paju-si (KR); Sung Won Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/514,462

(22) Filed: Nov. 20, 2023

(65) Prior Publication Data

US 2024/0221636 A1 Jul. 4, 2024

(30) Foreign Application Priority Data

Dec. 29, 2022 (KR) ........................ 10-2022-0188922

(51) Int. Cl.
*G09G 3/3225* (2016.01)

(52) U.S. Cl.
CPC ... *G09G 3/3225* (2013.01); *G09G 2300/0426* (2013.01); *G09G 2300/0842* (2013.01)

(58) Field of Classification Search
CPC ......... G09G 3/3225; G09G 2300/0426; G09G 2300/0842; G09G 3/3233; G09G 3/32; G09G 3/006; G09G 2320/0233; G09G 2320/04; G09G 3/3275; G09G 2310/08; G09G 2320/0242
See application file for complete search history.

(56) References Cited

U.S. PATENT DOCUMENTS

| | | | | |
|---|---|---|---|---|
| 8,791,887 B2 * | 7/2014 | Smith | G09G 3/3283 | 345/78 |
| 9,373,280 B2 * | 6/2016 | Yoon | G09G 3/3233 | |
| 9,576,530 B2 * | 2/2017 | Kanda | G09G 3/3233 | |
| 10,541,292 B2 * | 1/2020 | Lim | H10K 59/35 | |
| 10,685,602 B2 * | 6/2020 | Chen | G09G 3/3258 | |
| 10,769,992 B2 * | 9/2020 | Li | G09G 3/3233 | |
| 11,398,191 B2 * | 7/2022 | Kim | G09G 3/3291 | |
| 2005/0017935 A1 * | 1/2005 | Hirama | G09G 3/3688 | 345/87 |
| 2008/0165109 A1 * | 7/2008 | Joo | G09G 3/3677 | 345/98 |
| 2010/0188320 A1 * | 7/2010 | Min | G09G 3/3291 | 345/80 |
| 2010/0277400 A1 * | 11/2010 | Jeong | G09G 3/3275 | 345/76 |
| 2011/0074762 A1 * | 3/2011 | Shirasaki | G09G 3/3225 | 345/76 |
| 2011/0122119 A1 * | 5/2011 | Bae | G09G 3/3233 | 345/211 |
| 2011/0157134 A1 * | 6/2011 | Ogura | G09G 3/20 | 345/82 |
| 2011/0205250 A1 * | 8/2011 | Yoo | G09G 3/3233 | 345/77 |

(Continued)

*Primary Examiner* — Jose R Soto Lopez
(74) *Attorney, Agent, or Firm* — Fenwick & West LLP

(57) ABSTRACT

Provided is a display device including a display panel including subpixels connected to a low voltage line configured to deliver a low voltage and a data line configured to deliver a data voltage, a sensing switch configured to electrically connect the low voltage line and the data line, and a data driver including a sensing circuit configured to sense the low voltage line through the data line to prepare a sensed value when the sensing switch operates.

9 Claims, 18 Drawing Sheets

(56) References Cited

U.S. PATENT DOCUMENTS

| | | | | |
|---|---|---|---|---|
| 2011/0216056 | A1* | 9/2011 | Yoo | G09G 3/32 345/212 |
| 2013/0050292 | A1* | 2/2013 | Mizukoshi | G09G 3/3233 345/77 |
| 2013/0093652 | A1* | 4/2013 | Kim | G09G 3/3233 345/77 |
| 2013/0099692 | A1* | 4/2013 | Chaji | G09G 3/3233 315/224 |
| 2015/0302793 | A1* | 10/2015 | In | G09G 5/18 345/82 |
| 2017/0039952 | A1* | 2/2017 | Kim | G09G 3/3233 |
| 2018/0024677 | A1* | 1/2018 | Kim | G06F 3/0412 345/173 |
| 2020/0020278 | A1* | 1/2020 | Lee | G09G 3/3275 |
| 2020/0150813 | A1* | 5/2020 | Tanemura | G06F 3/0416 |
| 2021/0149264 | A1* | 5/2021 | Iwasa | G02F 1/136286 |
| 2021/0150981 | A1* | 5/2021 | Lee | G09G 3/3233 |
| 2021/0201787 | A1* | 7/2021 | Yuan | G09G 3/3291 |
| 2021/0287583 | A1* | 9/2021 | Shin | G09G 3/3275 |
| 2021/0327367 | A1* | 10/2021 | An | G09G 3/3685 |
| 2022/0068192 | A1* | 3/2022 | Lee | G09G 3/2096 |
| 2022/0108650 | A1* | 4/2022 | Park | G09G 3/3233 |

* cited by examiner

DISPLAY DEVICE AND METHOD OF DRIVING THE SAME

CROSS-REFERENCE TO RELATED APPLICATION

This application claims the benefit of Republic of Korea Patent Application No. 10-2022-0188922, filed on Dec. 29, 2022, which is hereby incorporated by reference in its entirety.

BACKGROUND

Field

The present disclosure relates to a display device and a method of driving the same.

Discussion of the Related Art

With the development of information technology, the market for display devices that connects users and information has been growing. Accordingly, display devices such as a light-emitting display (LED) device, a quantum dot display (QDD), and a liquid crystal display (LCD) have been increasingly used.

The above display devices each include a display panel including subpixels, a driver configured to output a driving signal for driving of the display panel, and a power supply configured to generate power to be supplied to the display panel or the driver.

In such a display device, when subpixels formed in a display panel are supplied with driving signals, for example, a scan signal and a data signal, a selected one thereof may transmit light therethrough or may directly emit light, thereby displaying an image.

SUMMARY

Accordingly, the present disclosure is directed to a display device and a method of driving the same that substantially obviate one or more problems due to limitations and disadvantages of the related art.

The present disclosure uniformizes display quality throughout the display panel by compensating a data signal (or data voltage) based on a change in the low voltage due to an influence of current resistance (IR) for each position of the subpixels. In addition, the present disclosure directly senses a low voltage line for each color of the subpixels included in the display panel, and prepares a compensation value for each color capable of compensating for the change in the low voltage therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display panel including subpixels connected to a low voltage line configured to deliver a low voltage and a data line configured to deliver a data voltage, a sensing switch configured to electrically connect the low voltage line and the data line, and a data driver including a sensing circuit configured to sense the low voltage line through the data line to prepare a sensed value when the sensing switch operates.

The sensing switch may include a sensing transistor which is disposed in a non-active area of the display panel, has a first electrode connected to the data line, has a second electrode connected to the low voltage line, and is independently controlled.

A gate electrode of the sensing transistor may be connected to a dummy gate line.

The sensing switch may include a plurality of sensing transistors, and the plurality of sensing transistors may be turned on sequentially, in reverse order, or randomly.

The sensing switch may include a plurality of sensing transistors, and turn on a sensing transistor connected to a subpixel in a non-operating state among the plurality of sensing transistors so that a voltage or current applied through a subpixel in an operating state among the subpixels is sensed.

The display device further includes a timing controller configured to control the data driver, and the timing controller may compensate for a change in a low voltage according to an influence of current resistance (IR) for each position of the subpixels based on the sensed value.

The sensing switch may include a plurality of sensing transistors, and when two subpixels horizontally adjacent to each other in the display panel share one low voltage line, one of two sensing transistors connected to the two subpixels may be turned on and the other may be turned off.

The sensing circuit may sense a rise of a low voltage for each color of the subpixels in response to an operation of the sensing switch and prepare a sensed value for each color.

In another aspect of the present disclosure, a method of driving a display device including a display panel having a sensing switch that electrically connects a low voltage line configured to deliver a low voltage and a data line configured to deliver a data voltage includes driving the display panel, operating the sensing switch and sensing the low voltage line through the data line, deriving a compensation parameter based on a sensed value prepared through sensing of the low voltage line, and compensating for a change in the low voltage according to an influence of IR for each position of subpixels included in the display panel based on the compensation parameter.

The low voltage line may be sensed for each certain period and certain amount of use of the display panel, and the compensation parameter may be updated in response to sensing of the low voltage line.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

A display device according to the present disclosure may be implemented as a television, a video player, a personal computer (PC), a home theater, an automotive electric device, or a smartphone, but is not limited thereto. The display device according to the present disclosure may be implemented as an LED device, a QDD, or an LCD. For convenience of description, an LED device that directly emits light based on an inorganic light-emitting diode or an organic light-emitting diode will hereinafter be taken as an example of the display device according to the present disclosure.

In addition, a thin film transistor (TFT) described below may be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier starts flowing from the source. The drain is an electrode through which a carrier exits the TFT. That is, in the TFT, a carrier flows from the source to the drain.

In the case of the p-type TFT, since the carrier is a hole, a source voltage is higher than a drain voltage so that the hole may flow from the source to the drain. In the p-type TFT, a hole flows from the source to the drain side, and thus current flows from the source to the drain side. In contrast, in the case of the n-type TFT, since an electron is a carrier, the source voltage is lower than the drain voltage so that an electron may flow from the source to the drain. In the n-type TFT, an electron flows from the source to the drain side, and thus current flows from the drain to the source side. However, the source and the drain of the TFT may be changed depending on the applied voltage. Reflecting this, in the following description, one of the source and drain will be described as a first electrode, and the other of the source and drain will be described as a second electrode.

Figure 1:
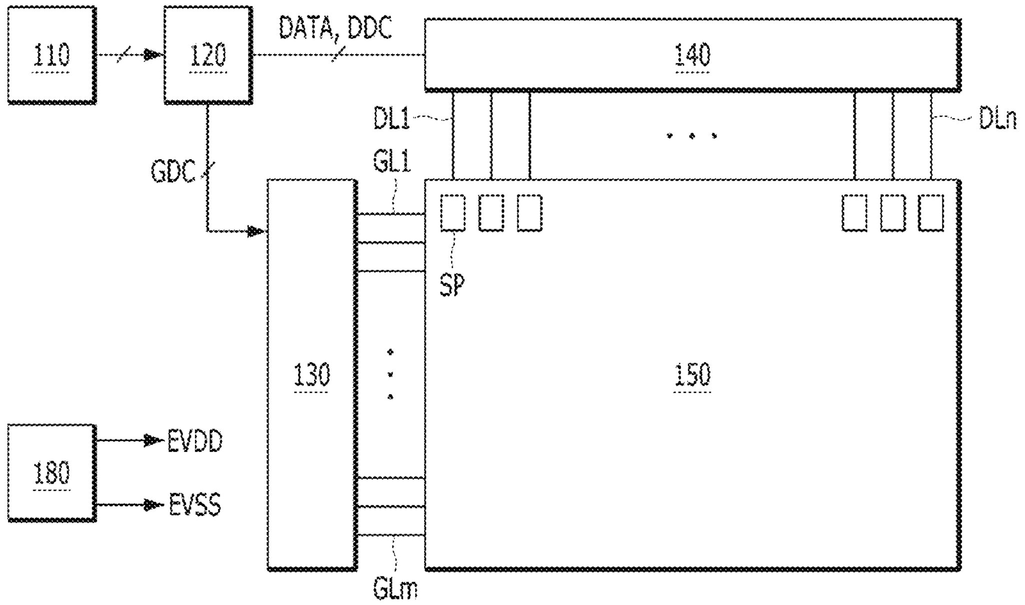
FIG. 1 is a block diagram schematically illustrating an LED device according to an embodiment of the present disclosure.
Figure 2:
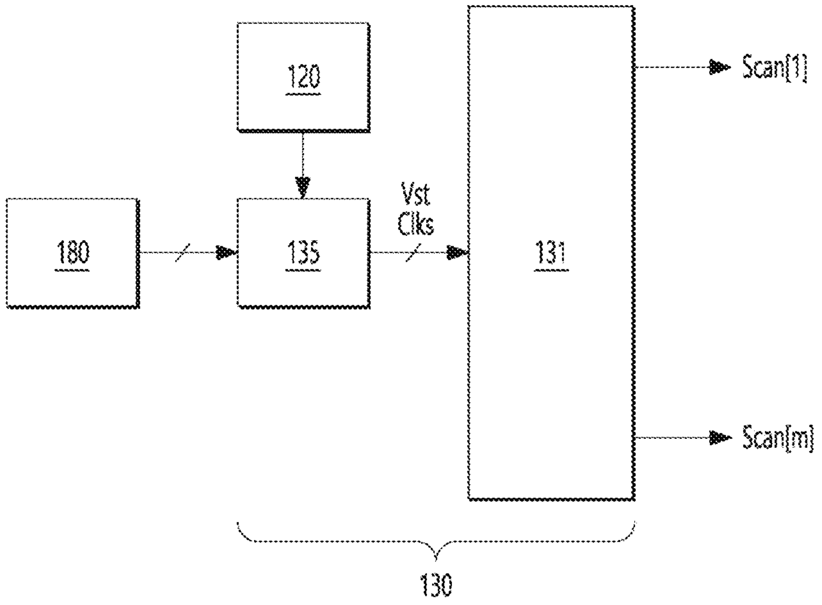
FIGS. 2 and 3 are diagrams for describing a configuration of a GIP type scan driver according to an embodiment of the present disclosure.
Figure 3:
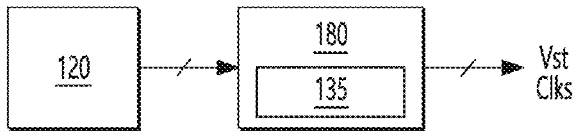
Figure 4:
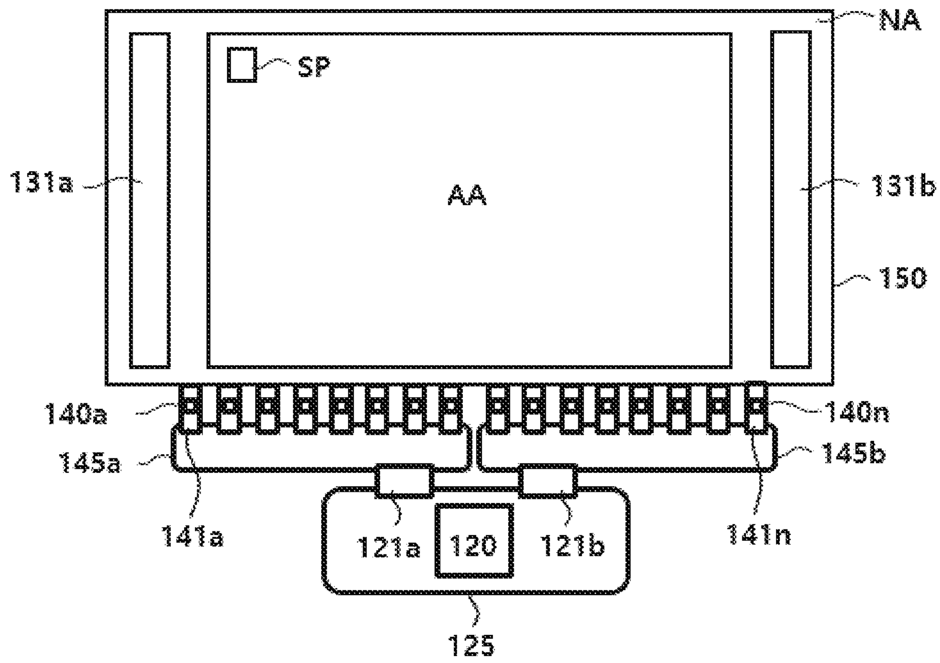
FIG. 4 is a module configuration diagram of the LED device according to an embodiment of the present disclosure.
Figure 5:
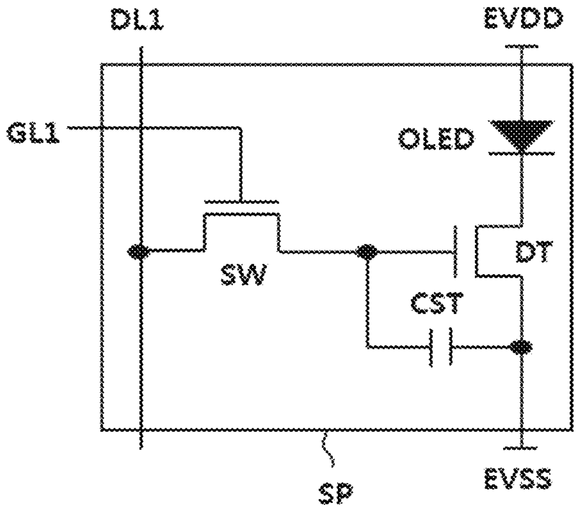
FIG. 5 is an illustrative circuit configuration diagram of a subpixel according to an embodiment of the present disclosure.

FIG. 1 is a block diagram schematically illustrating an LED device according to an embodiment of the present disclosure. FIGS. 2 and 3 are diagrams for describing a configuration of a GIP type scan driver according to an embodiment of the present disclosure. FIG. 4 is a module configuration diagram of the LED device according to an embodiment of the present disclosure. FIG. 5 is an illustrative circuit configuration diagram of a subpixel according to an embodiment of the present disclosure.

As illustrated in FIG. 1, the LED device may include an image supply 110, a timing controller 120, a scan driver 130, a data driver 140, a display panel 150, a power supply 180, etc.

The image supply (set or host system) 110 may output various driving signals together with an externally supplied image data signal or an image data signal stored in an internal memory. The image supply 110 may supply the data signal and the various driving signals to the timing controller 120.

The timing controller 120 may output a gate timing control signal GDC for control of operation timing of the scan driver 130, a data timing control signal DDC for control of operation timing of the data driver 140, and various synchronization signals (a vertical synchronization signal VSYNC and a horizontal synchronization signal HSYNC). The timing controller 120 may supply a data signal DATA supplied from the image supply 110 together with the data timing control signal DDC to the data driver 140. The timing controller 120 may take the form of an integrated circuit (IC) and be mounted on a printed circuit board, but is not limited thereto.

The scan driver 130 may output a scan signal (or scan voltage) in response to the gate timing control signal GDC supplied from the timing controller 120. The scan driver 130 may supply the scan signal to subpixels included in the display panel 150 through gate lines GL1 to GLm. The scan driver 130 may take the form of an IC or may be formed directly on the display panel 150 in a GIP manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply the data voltage to the subpixels included in the display panel 150 through data lines DL1 to DLn. The data driver 140 may take the form of an IC and be mounted on the display panel 150 or on the printed circuit board, but is not limited thereto.

The power supply 180 may generate a high voltage and a low voltage based on an external input voltage supplied from the outside and output the high voltage and the low voltage through a high voltage line EVDD and a low voltage line EVSS. The power supply 180 may generate and output not only the high voltage and the low voltage, but also a voltage (for example, a gate high voltage and a gate low voltage) required for driving the scan driver 130 or a voltage (for example, a drain voltage and a half drain voltage) required for driving the data driver 140.

The display panel 150 may display an image based on a driving signal including a scan signal and a data voltage, a high voltage, a low voltage, etc. Subpixels of the display panel 150 may directly emit light. The display panel 150 may be manufactured based on a rigid or flexible substrate of glass, silicon, polyimide, etc. In addition, subpixels emitting light may include pixels including red, green, and blue or pixels including red, green, blue, and white. For example, one subpixel SP may be connected to the first data line DL1, the first gate line GL1, the high voltage line EVDD, and the low voltage line EVSS.

Meanwhile, the timing controller 120, the scan driver 130, the data driver 140, etc., have been described as having individual configurations. However, one or more of the timing controller 120, the scan driver 130, and the data driver 140 may be integrated into one IC depending on the implementation scheme of the LED device.

As illustrated in FIGS. 2 and 3, the GIP-type scan driver 130 may include a shift register 131 and a level shifter 135. The level shifter 135 may generate scan clock signals Clks, a start signal Vst, etc., based on signals and voltages output from the timing controller 120 and the power supply 180.

The shift register 131 may operate based on the signals Clks and Vst, etc., output from the level shifter 135, and output scan signals Scan[1] to Scan[m] capable of turning on or turning off transistors formed on the display panel. The shift register 131 may be formed in the form of a thin film on the display panel using a GIP method.

Unlike the shift register 131, the level shifter 135 may independently take the form of an IC or may be included in the power supply 180. However, this is merely one example, and the level shifter 135 is not limited thereto.

As illustrated in FIG. 4, the display panel 150 may include an active area AA in which images are displayed and a non-active area NA in which images are not displayed. The subpixels SP may be located in the active area AA. In the non-active area NA, shift registers 131*a* and 131*b* configured to output scan signals from the GIP type scan driver may be located.

The display panel 150 may include a plurality of data drivers 140*a* to 140*n* mounted on a plurality of first circuit boards 141*a* to 141*n* and one timing controller 120 mounted on one control board 125. The plurality of data drivers 140*a* to 140*n* and the one timing controller 120 may be electrically connected by at least two second circuit boards 145*a* to 145*b* and at least two cables 121*a* to 121*b*. The plurality of first circuit boards 141*a* to 141*n* may be selected as flexible circuit boards, and the at least two second circuit boards 145*a* to 145*b* may be selected as printed circuit boards. However, the module configuration diagram illustrated in FIG. 4 is only for aiding in understanding, and the present disclosure is not limited thereto.

As illustrated in FIG. 5, a subpixel SP may include a switching transistor SW, a capacitor CST, a driving transistor DT, and an organic light-emitting diode OLED. The switching transistor SW and the driving transistor DT are n-type as an example. However, the present disclosure is not limited thereto.

The switching transistor SW may have a gate electrode connected to the first gate line GL1, a first electrode connected to an Nth data line DLn, and a second electrode connected to a gate electrode of a driving transistor DT. The switching transistor SW may serve to transfer a data voltage applied through a first data line DL1 to a first electrode of the capacitor CST.

The capacitor CST may have the first electrode connected to the gate electrode of the driving transistor DT, and a second electrode connected to a second electrode of the driving transistor DT and the low voltage line EVSS. The capacitor CST may serve to store a data voltage for driving the driving transistor DT.

The driving transistor DT may have the gate electrode connected to the first electrode of the capacitor CST, the first electrode connected to a cathode of the organic light-emitting diode OLED, and the second electrode connected to the low voltage line EVSS. The driving transistor DT may serve to generate a driving current in response to a data voltage stored in the capacitor CST.

The organic light-emitting diode OLED may have an anode connected to the high voltage line EVDD and a cathode connected to the first electrode of the driving transistor DT. The organic light-emitting diode OLED may serve to emit light in response to operation (driving current) of the driving transistor DT.

Figure 6:
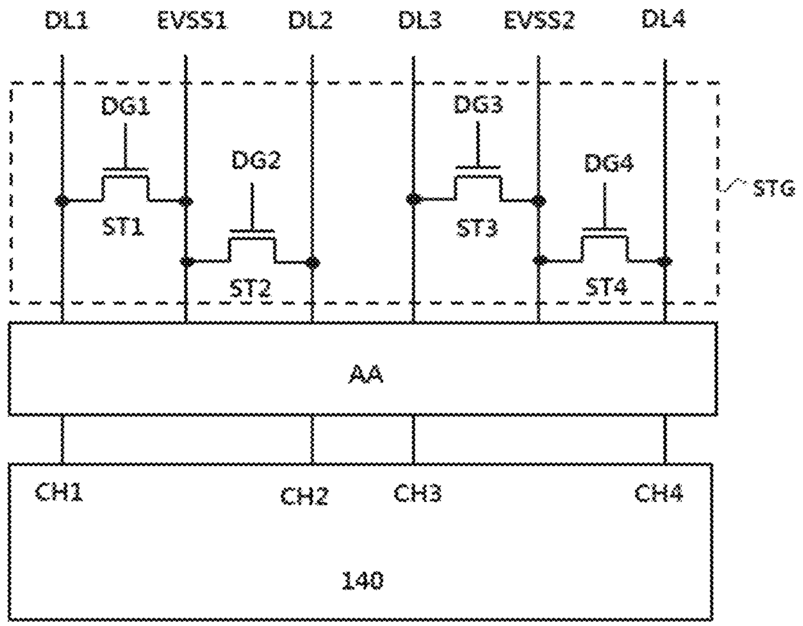
FIG. 6 is a diagram illustrating a partial configuration of an LED device according to a first embodiment of the present disclosure.
Figure 7:
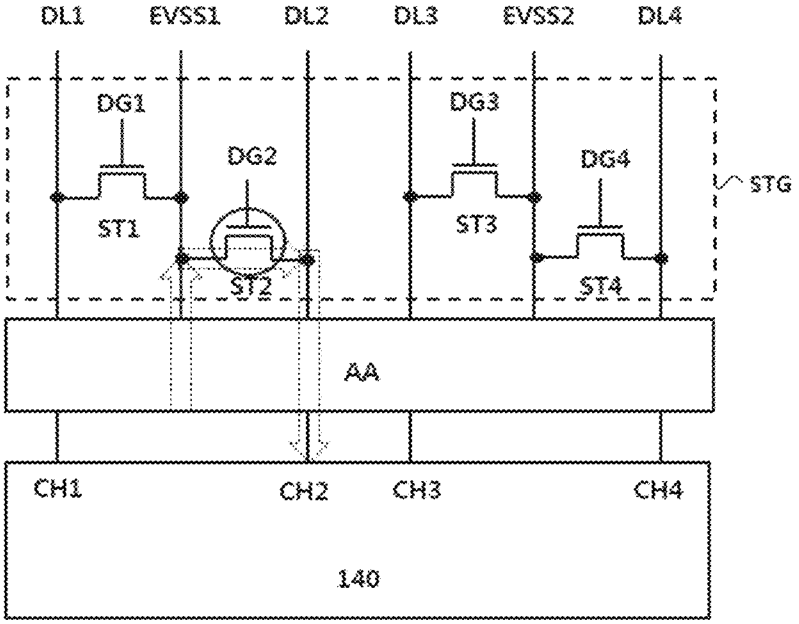
FIGS. 7 to 9 are diagrams for describing a sensing switch illustrated in FIG. 6 according to an embodiment of the present disclosure.
Figure 8:
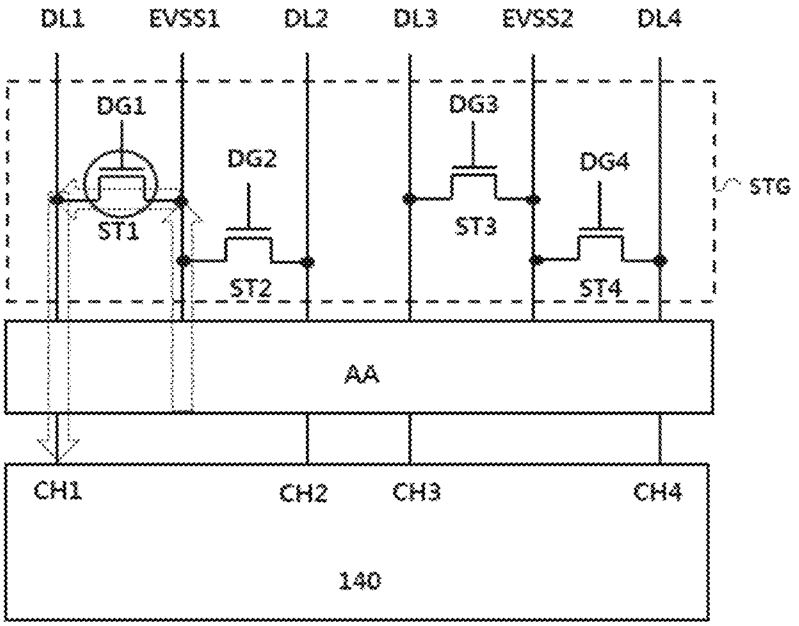
Figure 9:
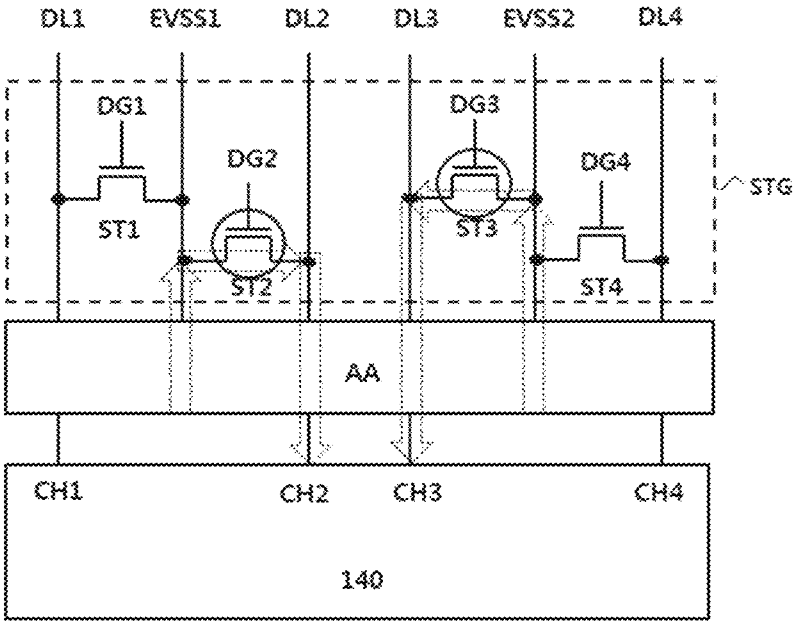
Figure 10:
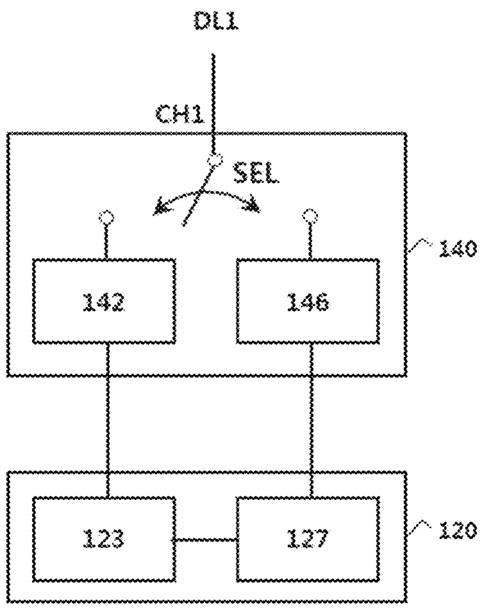
FIGS. 10 to 12 are diagrams for describing operations of a data driver and a timing controller according to an operating state of the sensing switch, according to an embodiment of the present disclosure.
Figure 11:
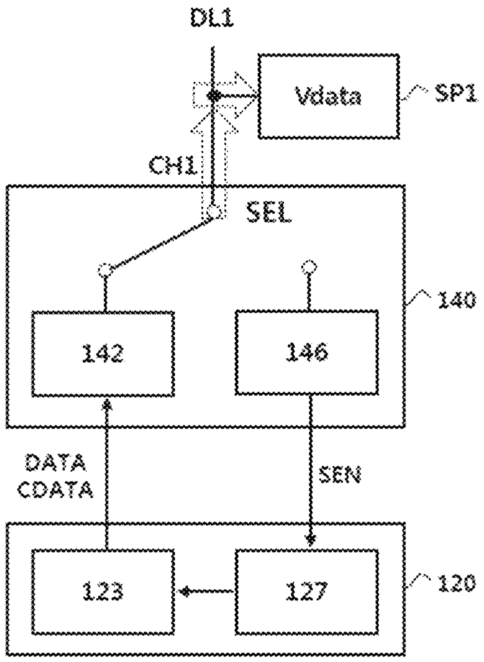
Figure 12:
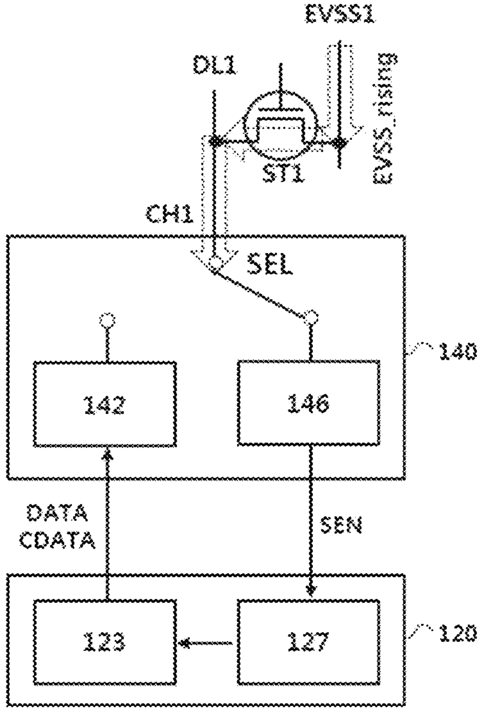

FIG. 6 is a diagram illustrating a partial configuration of an LED device according to a first embodiment of the present disclosure. FIGS. 7 to 9 are diagrams for describing a sensing switch illustrated in FIG. 6, according to an embodiment of the present disclosure. FIGS. 10 to 12 are diagrams for describing operations of a data driver and a timing controller according to an operating state of the sensing switch, according to an embodiment of the present disclosure.

As illustrated in FIG. 6, the LED device according to the first embodiment may include a sensing switch STG capable of directly sensing a voltage or current applied through low voltage lines EVSS1 and EVSS2. The sensing switch STG may be disposed adjacent to the active area AA. The sensing switch STG may be connected to data lines DL1 to DL4, and the data lines DL1 to DL4 may be connected to channels CHI to CH4 of the data driver 140.

The sensing switch STG may include sensing transistors ST1 to ST4 configured to electrically connect the data lines DL1 to DL4 and the low voltage lines EVSS1 and EVSS2 to sense the low voltage lines EVSS1 and EVSS2 disposed adjacent to the data lines DL1 to DL4. The sensing transistors ST1 to ST4 may be independently controlled (operated) separately from the active area AA.

The sensing transistors ST1 to ST4 are disposed adjacent to the active area AA, and thus may be implemented based on a thin film process (deposition process) like elements included in the active area AA. The figure illustrates that n-type is selected for the sensing transistors ST1 to ST4 as an example. However, p-type may be selected.

Meanwhile, as an example, the sensing transistors ST1 to ST4 are arranged (1:1 arrangement) corresponding to the number of the data lines DL1 to DL4. However, an arrangement relationship between the sensing transistors and the data lines may be K (K being an integer greater than or equal to 2):1.

The first sensing transistor ST1 may have a gate electrode connected to a first dummy gate line DG1, a first electrode connected to the first data line DL1, and a second electrode connected to the first low voltage line EVSS1. The second sensing transistor ST2 may have a gate electrode connected to a second dummy gate line DG2, a first electrode connected to the second data line DL2, and a second electrode connected to the first low voltage line EVSS1.

The third sensing transistor ST3 may have a gate electrode connected to a third dummy gate line DG3, a first electrode connected to the third data line DL3, and a second electrode connected to the second low voltage line EVSS2. The fourth sensing transistor ST4 may have a gate electrode connected to a fourth dummy gate line DG4, a first electrode connected to the fourth data line DL4, and a second electrode connected to the second low voltage line EVSS2.

As illustrated in FIGS. 7 to 9, when at least one of the sensing transistors ST1 to ST4 included in the sensing switch STG is turned on, the data driver 140 may sense a voltage or current applied through the low voltage lines EVSS1 and EVSS2 through the turned-on sensing transistor.

FIG. 7 illustrates sensing a voltage or current applied through the first low voltage line EVSS1 as the second sensing transistor ST2 is turned on. FIG. 8 illustrates sensing a voltage or current applied through the first low voltage line EVSS1 as the first sensing transistor ST1 is turned on. FIG. 9 illustrates sensing voltages or currents applied through the first and second low voltage lines EVSS1 and EVSS2 as the second and third sensing transistors ST2 and ST3 are turned on.

The sensing transistors ST1 to ST4 may be turned on sequentially (or in reverse order) from the first sensing transistor ST1 to the fourth sensing transistor ST4, or one or more of the sensing transistors may be randomly turned on. However, when two adjacent subpixels share one low voltage line, one of the two sensing transistors connected to the two subpixels may be turned on and the other may be turned off. A reason therefor is to sense a low voltage line connected to an operating subpixel among the two subpixels.

As illustrated in FIG. 10, the data driver 140 may include a voltage generator 142 configured to generate and output a data voltage, a sensing circuit 146 configured to sense a voltage or current, a selection switch SEL configured to connect the first data line DL1 to the voltage generator 142 or to the sensing circuit 146, etc.

The sensing circuit 146 may include a voltage sensing circuit to sense voltage or a current integration circuit to sense current. However, the present disclosure is not limited thereto. The selection circuit SEL may operate in response to a selection signal generated from the data driver 140 or the timing controller 120. However, the present disclosure is not limited thereto.

The timing controller 120 may include a compensation circuit 127 configured to generate a compensation value based on a sensed value, a signal generator 123 configured to image-process and output a data signal input from the outside or to compensate for a data signal based on a compensation value and output a compensated data signal, etc.

As illustrated in FIG. 11, the selection circuit SEL may connect the first data line DL1 to the voltage generator 142 during a driving period of the display panel. During the driving period of the display panel, the timing controller 120 may deliver the data signal DATA or a compensated data signal CDATA to the voltage generator 142 of the data driver 140. The voltage generator 142 of the data driver 140 may output a data voltage based on the data signal DATA or output a compensated data voltage based on the compensated data signal CDATA.

The data voltage (or compensated data voltage) Vdata output from the voltage generator 142 of the data driver 140 may be stored in the first subpixel SP1 (or the first subpixel SP1 may be charged with the data voltage) through the first data line DL1. The first subpixel SP1 operates based on the data voltage (or compensated data voltage) Vdata, and may emit light for displaying an image.

As illustrated in FIG. 12, the selection circuit SEL may connect the first data line DL1 to the sensing circuit 146 during a sensing period of the display panel. During the sensing period of the display panel, the sensing circuit 146 of the data driver 140 senses a voltage or current applied through the first low voltage line EVSS1 through the first data line DL1, and may deliver a prepared sensed value SEN to the compensation circuit 127 of the timing controller 120.

The compensation circuit 127 of the timing controller 120 may calculate a rise (EVSS_rising) (variation) of the low voltage according to the influence of the current resistance (IR) for each position of the subpixels based on the sensed value SEN, prepare a compensation value based thereon, and deliver the compensation value to the signal generator 123. The signal generator 123 of the timing controller 120 may compensate the data signal based on the compensation value, and output the compensated data signal CDATA.

Figure 13:
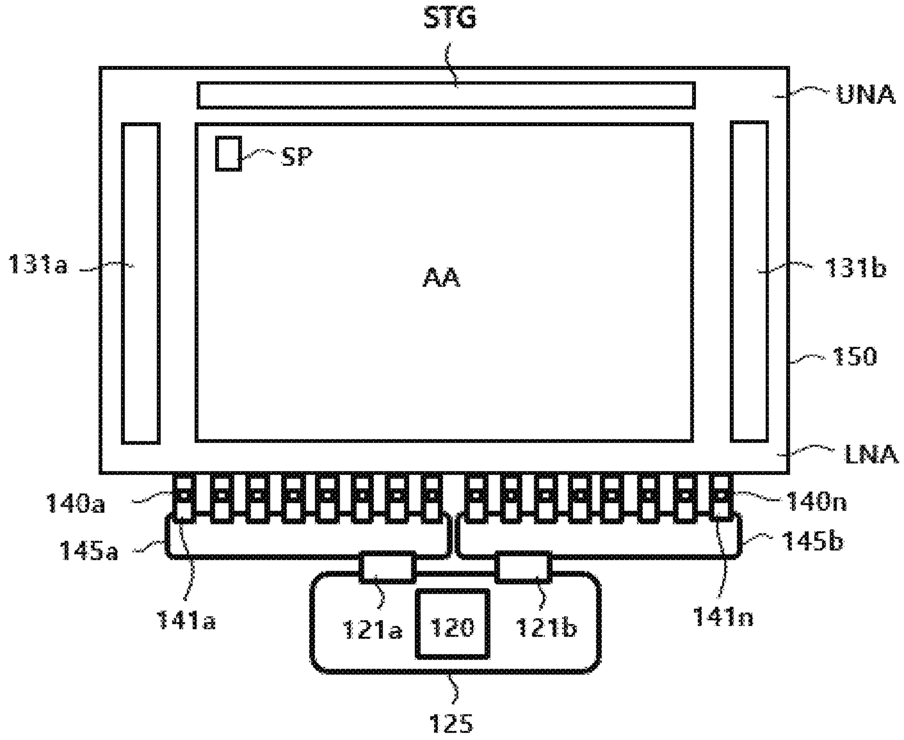
FIGS. 13 and 14 are illustrative diagrams illustrating locations where the sensing switch is disposed according to the first embodiment of the present disclosure.
Figure 14:
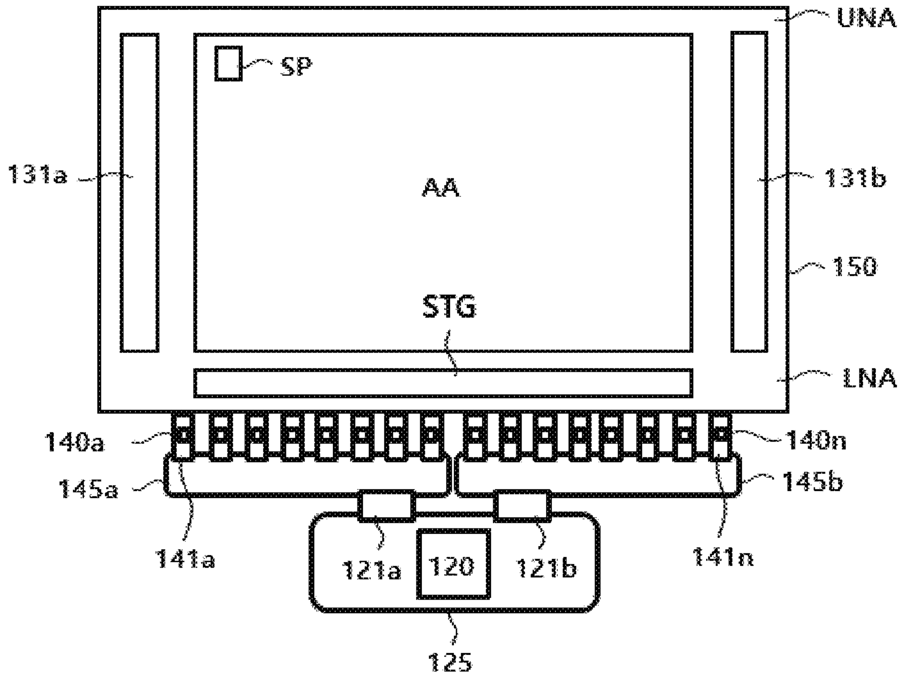

FIGS. 13 and 14 are illustrative diagrams illustrating locations where the sensing switch is disposed according to the first embodiment of the present disclosure.

As illustrated in FIGS. 13 and 14, the sensing switch STG is located adjacent to the active area AA, and may be disposed in an upper non-active area UNA or a lower non-active area LNA with respect to the active area AA.

A mode in which the sensing switch STG is disposed in the upper non-active area UNA with respect to the active area AA as illustrated in FIG. 13 may be applied to a mode in which a low voltage is supplied through the lower non-active area LNA and delivered to the upper non-active area UNA.

A mode in which the sensing switch STG is disposed in the lower non-active area LNA with respect to the active area AA as illustrated in FIG. 14 may be applied to a mode in which a low voltage is supplied through the upper non-active area UNA and delivered to the lower non-active area LNA.

Figure 15:
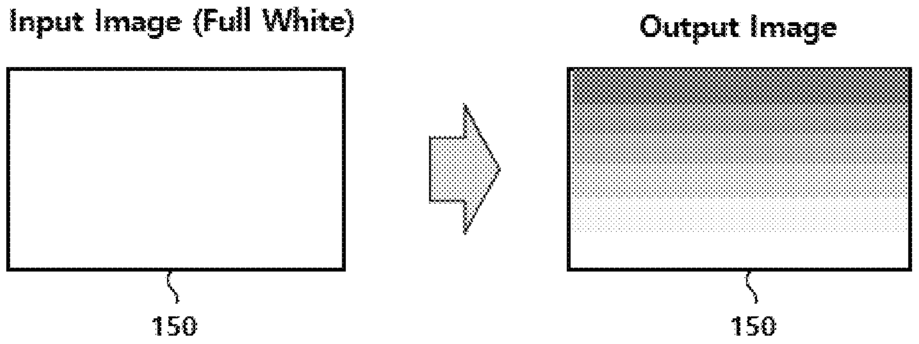
FIGS. 15 and 16 are diagrams for describing advantages of the first embodiment of the present disclosure.
Figure 16:
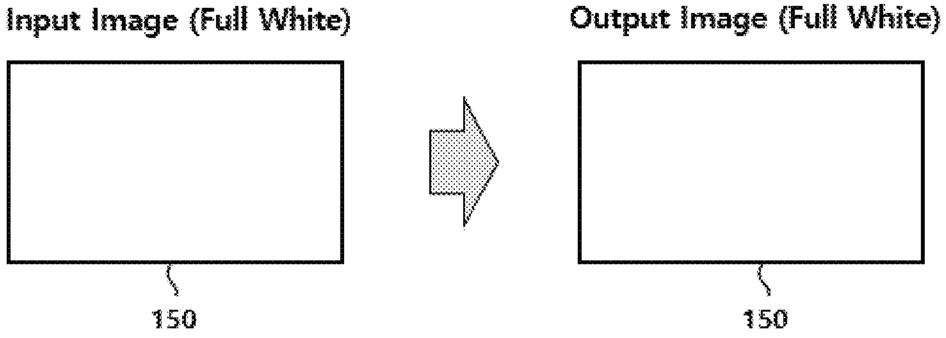

FIGS. 15 and 16 are diagrams for describing advantages of the first embodiment of the present disclosure.

As illustrated in FIG. 15, a display device according to an experimental example cannot compensate for a change in the low-potential voltage due to the influence of the IR for each position of the subpixels included in the display panel 150. As a result, when an input image for full white is supplied to the display panel 150, the display device according to the experimental example may display an output image having a luminance deviation in a gradation form unlike the input.

As illustrated in FIG. 16, the display device according to the first embodiment may compensate for a change in the low-potential voltage according to the influence of the IR for each position of the subpixels included in the display panel 150. As a result, when an input image for full white is supplied to the display panel 150, the display device according to the first embodiment may display an output image having full white similar or identical to the input. That is, the display device according to the first embodiment may compensate for the data signal (or data voltage) based on a change in the low voltage according to the influence of the IR for each position of the subpixels to uniformize display quality throughout the display panel 150.

Figure 17:
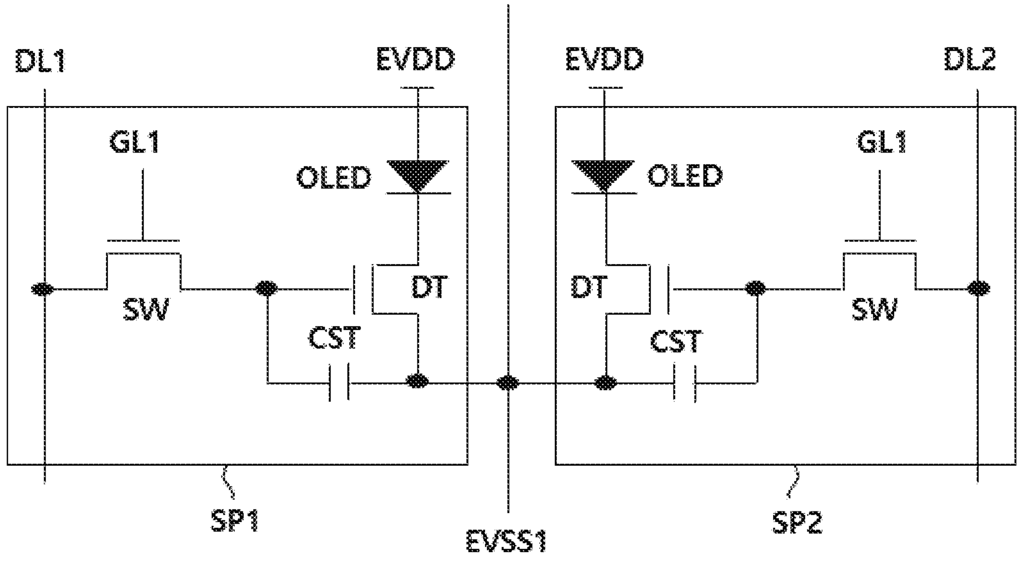
FIGS. 17 and 18 are diagrams for describing a sensing method of an LED device according to a second embodiment of the present disclosure.
Figure 18:
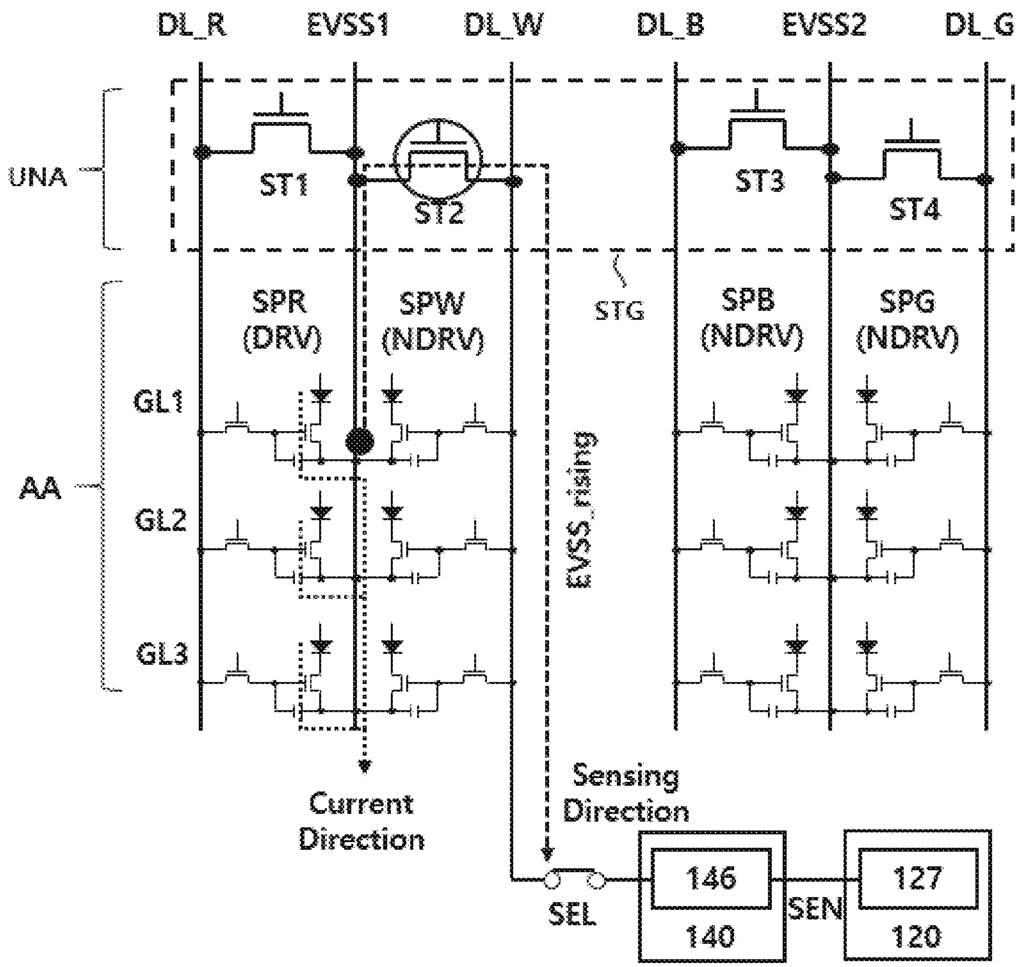
Figure 19:
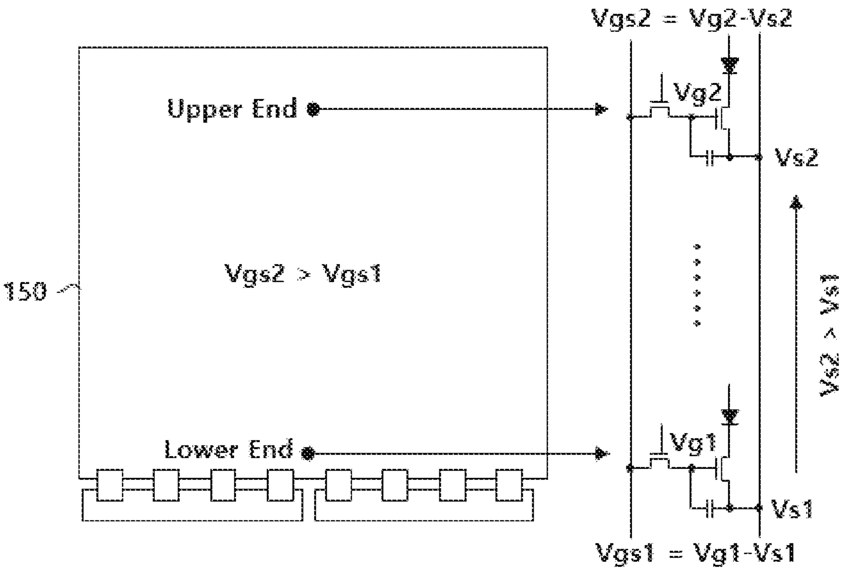
FIGS. 19 and 20 are diagrams for describing a compensation method according to the second embodiment of the present disclosure.
Figure 20:
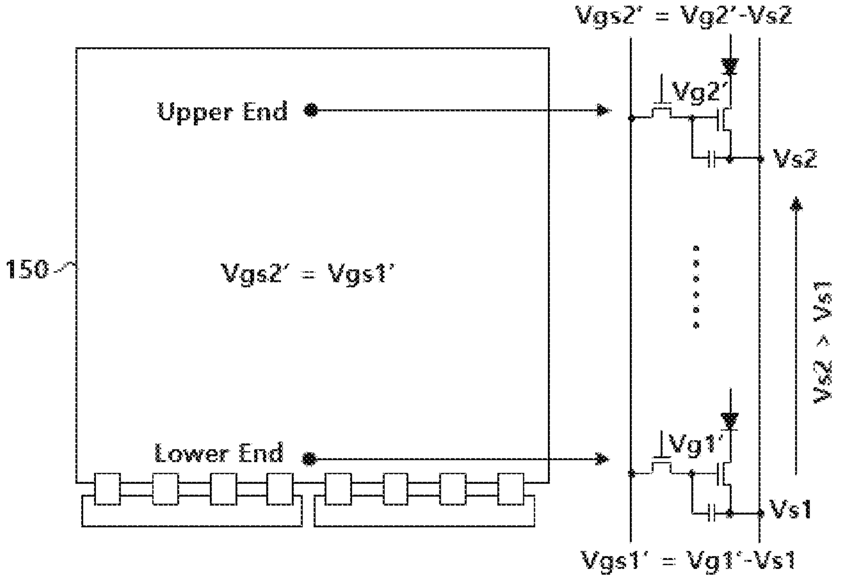

FIGS. 17 and 18 are diagrams for describing a sensing method of an LED device according to a second embodiment of the present disclosure, and FIGS. 19 and 20 are diagrams for describing a compensation method according to the second embodiment of the present disclosure.

As illustrated in FIG. 17, according to the second embodiment, the first subpixel SP1 and the second subpixel SP2 horizontally adjacent to each other may share the first low voltage line EVSS1 located therebetween. That is, subpixels formed on the display panel may be arranged in the form illustrated in FIG. 17.

As illustrated in FIG. 18, according to the second embodiment, subpixels SPR, SPW, SPB, and SPG may be disposed in the active area AA, and the sensing switch STG, which operates to directly sense a low voltage, may be disposed in the upper non-active area UNA.

The subpixels SPR, SPW, SPB, and SPG may include a red subpixel SPR, a white subpixel SPW, a blue subpixel SPB, and a green subpixel SPG, which may be defined as one pixel. As an example, the red subpixel SPR, the white subpixel SPW, the blue subpixel SPB, and the green subpixel SPG are disposed in this order in the active area AA. However, the present disclosure is not limited thereto.

The red subpixel SPR connected to a red data line DL_R and the white subpixel SPW connected to a white data line DL_W may be horizontally disposed adjacent to each other to share the first low voltage line EVSS1. In addition, a blue subpixel SPB connected to the blue data line DL_B and a green subpixel SPG connected to the green data line DL_G may be horizontally disposed adjacent to each other to share the second low voltage line EVSS2.

The red subpixel SPR, the white subpixel SPW, the blue subpixel SPB, and the green subpixel SPG positioned on a first horizontal line are connected to the first gate line GL1 and may operate in response to a first scan signal delivered therefrom. The red subpixel SPR, the white subpixel SPW, the blue subpixel SPB, and the green subpixel SPG positioned on a second horizontal line are connected to the second gate line GL2 and may operate in response to a second scan signal delivered therefrom. The red subpixel SPR, the white subpixel SPW, the blue subpixel SPB, and the green subpixel SPG positioned on a third horizontal line are connected to the third gate line GL3 and may operate in response to a third scan signal delivered therefrom.

Scan signals delivered through the first to third gate lines GL1 to GL3 may be generated sequentially (or in reverse order) or randomly from the first scan signal to the third scan signal. In addition, referring to the scan signals delivered through the first to third gate lines GL1 to GL3, the first to third scan signals may be simultaneously generated for the purpose of sensing. In addition, referring to a sensing signal, a plurality of scan signals may be simultaneously generated in a block form in order to block and scan a part of the active area AA.

When the second sensing transistor ST2 of the sensing switch STG is turned on, the sensing circuit 146 included in the data driver 140 may sense a voltage applied through the first low voltage line EVSS1. To this end, the sensing circuit 146 included in the data driver 140 may include an analog-to-digital converter, etc. to sense a change in the low voltage applied to each of the red subpixels SPR.

Hereinafter, a description will be given of one sensing process that may be performed during the sensing period of the display panel based on a state illustrated in FIG. 18.

In FIG. 18, as an example, the first sensing transistor ST1, the third sensing transistor ST3, and the fourth sensing transistor ST4 are turned off. In addition, in FIG. 18, as an example, in the active area AA, only red subpixels SPR are in an operating state DRV, and the remaining white subpixel SPW, blue subpixel SPB, and green subpixel SPG are in a non-operating state NDRV.

When the above conditions are set, the sensing circuit 146 of the data driver 140 may prepare the sensed value SEN by sensing a change in the low voltage applied to each of the red subpixels SPR through the white data line DL_W connected to the first low voltage line EVSS1. In addition, the compensation circuit 127 of the timing controller 120 may calculate a rise (EVSS_rising) (variation) of the low voltage according to the influence of the IR for each position of the red subpixels SPR based on the sensed value SEN, and prepare the compensation value based thereon.

During the sensing period of the display panel, when the scan signals are sequentially generated from the first scan signal to the third scan signal, the first gate line GL1 is scanned in a first time, and thus a rise (EVSS_rising) of the low voltage for the red subpixel SPR connected to the first gate line GL1 may be calculated. In addition, the second gate line GL2 is scanned in a second time, and thus a rise (EVSS_rising) of the low voltage for the red subpixel SPR connected to the second gate line GL2 may be calculated. In addition, the third gate line GL3 is scanned in a third time, and thus a rise (EVSS_rising) of the low voltage for the red subpixel SPR connected to the third gate line GL3 may be calculated.

As described above, after sensing the change in the low voltage applied to the red subpixels SPR, the change in the low voltage applied to one of the white subpixel SPW, blue subpixel SPB, and green subpixel SPG may be sensed. That is, the second embodiment may sense a rise of the low voltage for each color of the subpixels disposed in the active area AA, and prepare each compensation value for each color therefor. Accordingly, the display device may perform compensation for each position and color of subpixels based on the compensation value for each color.

As illustrated in FIG. 19, a difference may occur in gate-source voltages Vgs1 and Vgs2 of the driving transistors at lower and upper ends of the display panel 150 due to the rise of the low voltage. For example, the first gate-source voltage Vgs1 of the first driving transistor positioned at the lower end of the display panel 150 may be determined by the first gate voltage Vg1 and the first source voltage Vs1, which may be expressed as an equation "$Vgs1=Vg1-Vs1$". In addition, the second gate-source voltage Vgs2 of the second driving transistor located at the upper end of the display panel 150 may be determined by the second gate voltage Vg2 and the second source voltage Vs2, which may be expressed as an equation "$Vgs2=Vg2-Vs2$".

The source voltage of the display panel 150 may be affected when the low voltage changes. When the low voltage is supplied from the lower end of the display panel 150 and delivered to the upper end thereof, a second source voltage Vs2 may have a higher value than a first source voltage Vs1, which may be expressed as an inequality "$Vs2>Vs1$." Under this condition, when the rise of the low voltage is not compensated for, a difference may occur between the gate-source voltages applied to the lower and upper ends of the display panel 150, which may be expressed as an inequality "$Vgs2>Vgs1$."

As illustrated in FIG. 19, when the rise of the low voltage is not compensated for, the gate-source voltages have different values ($Vgs2>Vgs1$), and thus the upper end of the display panel 150 may exhibit lower luminance than that of the lower end. However, as illustrated in FIG. 20, when the gate voltages are compensated (Vg1', Vg2') based on the rise of the low voltage, the gate-source voltages have the same value ($Vgs2'=Vgs1'$) (or similar values), and thus the upper and lower ends of the display panel 150 may exhibit similar luminance. Here, as a method of compensating the gate voltages (Vg1', Vg2') based on the rise of the low voltage, a method of compensating the data signal output from the timing controller in order to change the data voltage output from the data driver may be given as an example. However, this is merely an example, and it is possible to use a method of directly compensating the data voltage or directly compensating the low voltage for each of at least one gate line.

The display device according to the second embodiment may compensate the data signal (or data voltage) based on the change in the low voltage according to the influence of the IR for each position of the subpixels, thereby uniformizing the display quality throughout the display panel 150.

Figure 21:
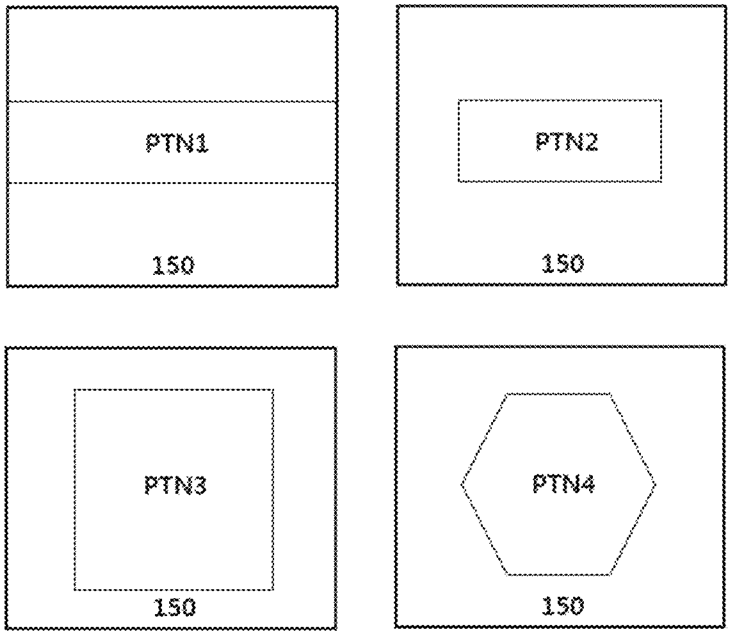
FIGS. 21 and 22 are diagrams for describing a method of generating a compensation map according to the second embodiment of the present disclosure.
Figure 22:
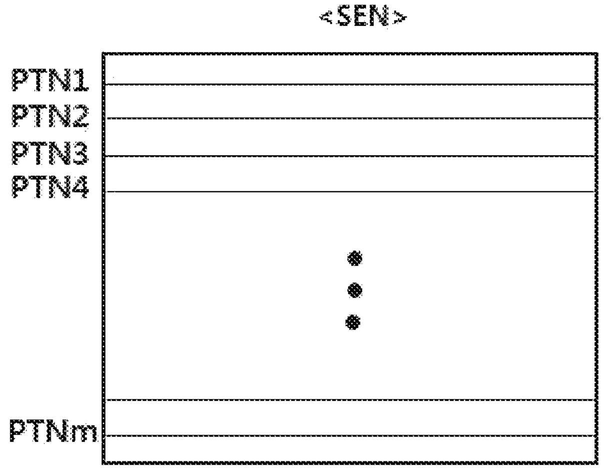

FIGS. 21 and 22 are diagrams for describing a method of generating a compensation map according to the second embodiment of the present disclosure.

As illustrated in FIG. 21, according to the second embodiment, various patterns (EVSS rising patterns) such as a first pattern PTN1 to a fourth pattern PTN4, various shapes (rectangle, quadrangle, polygon, triangle, circle, etc.) or various images may be displayed on the display panel 150. In addition, as illustrated in FIG. 22, the sensed value SEN corresponding to the rise of the low voltage according to the influence of the IR for each position of the subpixels may be prepared in the form of a compensation map based on the various patterns, shapes, or images displayed on the display panel 150. Further, the device may be configured so that, when a pattern, shape, or image corresponding to the sensed value SEN present in the compensation map is displayed on the display panel 150, a compensation value capable of compensating therefor is prepared (a compensation value calculation process based on derivation of a compensation parameter is omitted).

Figure 23:
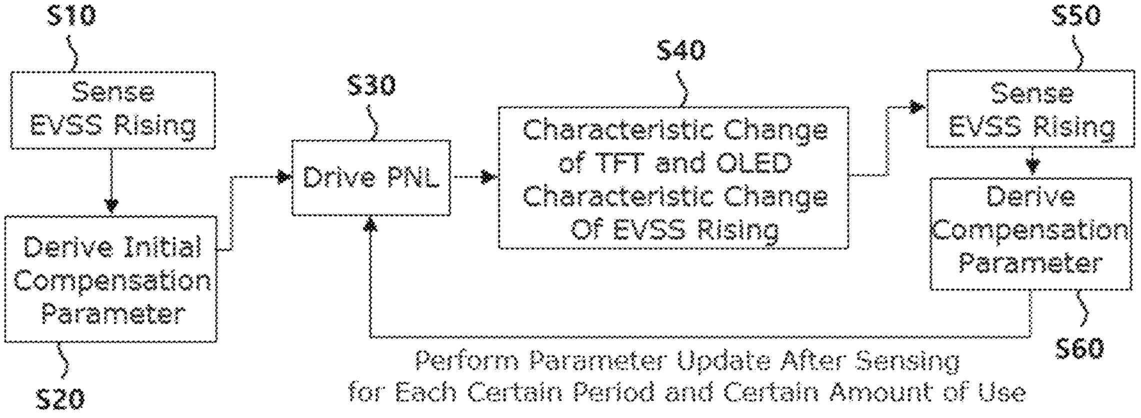
FIG. 23 is a diagram for describing a method of driving the LED device according to the second embodiment of the present disclosure.

FIG. 23 is a diagram for describing a method of driving the LED device according to the second embodiment of the present disclosure.

As illustrated in FIG. 23, the method of driving the LED device according to the second embodiment of the present disclosure may include a step S10 of sensing the rise of the low voltage (EVSS Rising Sensing) to a step S60 of deriving a compensation parameter.

The step S10 of sensing the rise of the low voltage and a step S20 of deriving an initial compensation parameter may be performed before shipment of the LED device, and a step S30 of using the display panel to the step S60 of deriving a compensation parameter may be performed after shipment of the LED device. However, the present disclosure is not limited thereto.

Meanwhile, as a time for driving the display panel (S30) increases, characteristics of a TFT (for example, the driving transistor) and an organic light-emitting diode (OLED) included therein may change. Accordingly, the rise of the low voltage may be sensed (S50) in consideration of characteristic changes of the TFT and the OLED and characteristic changes according to the rise of the low voltage (S40), and a compensation parameter may be derived (S60).

In addition, the characteristic changes of the TFT and the OLED and the characteristic changes according to the rise of the low voltage may not occur every frame. Therefore, the step S50 of sensing the rise of the low voltage may be performed for each certain period or certain amount of use in consideration of the characteristic changes of the TFT and the OLED and the characteristic changes according to the rise of the low voltage, and a parameter may be updated to reflect this step.

As described above, the present disclosure has an effect of being able to uniformize display quality throughout the display panel by compensating a data signal (or data voltage) based on a change in the low voltage due to the influence of the IR for each position of the subpixels. In addition, the present disclosure has an effect of being able to directly sense a low voltage through the sensing transistor capable of selectively connecting the data line and the low voltage line, and to compensate for the change in the low voltage based on a sensed voltage or current. In addition, the present disclosure has an effect of being able to sense a rise of the low voltage for each color of the subpixels included in the display panel, and to prepare a compensation value for each color therefor.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device comprising:

a display panel including subpixels is connected to a low voltage line that delivers a low voltage and a data line that delivers a data voltage;

a sensing switch configured to electrically connect the low voltage line and the data line; and a data driver comprising a sensing circuit, the sensing circuit configured to directly sense the low voltage line through the data line and prepare a sensed value when the sensing switch operates, wherein the sensing switch comprises:

a sensing transistor in a non-active area of the display panel, the sensing transistor having a first electrode that is directly connected to the data line and a second electrode that is directly connected to the low voltage line, and the sensing transistor is independently controlled.

2. The display device according to claim 1, wherein the sensing transistor further comprises a gate electrode that is connected to a dummy gate line.

3. The display device according to claim 2, wherein the sensing switch comprises:

a plurality of sensing transistors that are turned on sequentially, in reverse order, or randomly.

4. The display device according to claim 1, wherein the sensing switch comprises:

a plurality of sensing transistors, wherein the sensing switch turns on a sensing transistor from the plurality of sensing transistors that is connected to a subpixel among the subpixels in a non-operating state and senses a voltage or current applied through a subpixel in an operating state among the subpixels.

5. The display device according to claim 1, further comprising:

a timing controller configured to control the data driver, the timing controller configured to compensate for a change in a low voltage according to an influence of current resistance (IR) for each position of the subpixels based on the sensed value.

6. The display device according to claim 1, wherein the sensing switch comprises a plurality of sensing transistors; and responsive to two subpixels positioned horizontally adjacent to each other in the display panel are connected to one low voltage line, one of two sensing transistors that is connected to the two subpixels is turned on, and the other of the two sensing transistors is turned off.

7. The display device according to claim 1, wherein the sensing circuit is configured to sense a rise of a low voltage for each color of the subpixels responsive to an operation of the sensing switch and prepares a sensed value for each color.

8. A method of driving a display device comprising a display panel having a sensing switch that electrically connects a low voltage line that delivers a low voltage and a data line that delivers a data voltage, the method comprising:

driving the display panel;

operating the sensing switch and directly sensing the low voltage line through the data line;

deriving a compensation parameter based on a sensed value prepared through sensing of the low voltage line; and compensating for a change in the low voltage according to an influence of current resistance (IR) for each position of subpixels included in the display panel based on the compensation parameter, wherein the sensing switch comprises:

a sensing transistor in a non-active area of the display panel, the sensing transistor having a first electrode that is directly connected to the data line and a second electrode that is directly connected to the low voltage line, and the sensing transistor is independently controlled.

9. The method according to claim 8, wherein the low voltage line is sensed for a period and an amount of use of the display panel; and the compensation parameter is updated in response to sensing of the low voltage line.

* * * * *